(12) United States Patent
Suwa (10) Patent No.: US 11,974,043 B2
(45) Date of Patent: Apr. 30, 2024

(54) IMAGE STABILIZATION UNIT, LENS APPARATUS, AND IMAGE PICKUP APPARATUS

(71) Applicant: CANON KABUSHIKI KAISHA, Tokyo (JP)

(72) Inventor: Wataru Suwa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 17/538,472

(22) Filed: Nov. 30, 2021

(65) Prior Publication Data

US 2022/0174218 A1 Jun. 2, 2022

(30) Foreign Application Priority Data

Dec. 2, 2020 (JP) ................... 2020-200146

(51) Int. Cl.
*H04N 23/68* (2023.01)
*G02B 7/10* (2021.01)
(Continued)

(52) U.S. Cl.
CPC ........... *H04N 23/687* (2023.01); *G02B 7/102* (2013.01); *G02B 27/646* (2013.01); *G03B 5/02* (2013.01);
(Continued)

(58) Field of Classification Search
CPC ........ H04N 23/54; H04N 23/55; H04N 23/57; H04N 23/687; H04N 23/6812; H04N 23/663; G03B 5/02; G03B 5/04; G03B 17/14; G03B 2205/0007; G03B 2205/0053; G03B 2205/0069; G03B 2205/0015; G02B 27/646; G02B 7/02; G02B 7/102; H01F 7/02; H01F 7/081; H01F 7/126; H01F 7/1646; H01F 7/1844; H01F 2007/062; H01F 2007/185; H05K 1/147;
(Continued)

(56) References Cited

U.S. PATENT DOCUMENTS

2008/0074744 A1\* 3/2008 Osaka ................. H04N 23/687
359/554
2009/0002825 A1\* 1/2009 Morita ..................... G03B 5/00
359/554
(Continued)

FOREIGN PATENT DOCUMENTS

JP 2001100074 A * 4/2001 ............... G02B 7/02
JP 2001100074 A 4/2001

*Primary Examiner* — Twyler L Haskins
*Assistant Examiner* — Akshay Trehan
(74) *Attorney, Agent, or Firm* — Canon U.S.A., Inc. I.P. Division (57) ABSTRACT

An image stabilization unit includes an optical element, a lens barrel configured to hold the optical element, a magnet, and a fixing member. The image stabilization unit further includes a sensor that detects a position of the lens barrel by sensing magnetism of the magnet, and a flexible substrate connected to the sensor. The flexible substrate includes a sensor mounting portion mounted to the sensor, a movable-side holding portion held by the lens barrel, and a fixed-side holding portion held by the fixing member. The movable-side holding portion and the fixed-side holding portion are located in such a manner as to overlap the sensor mounting portion in an optical-axis direction.

10 Claims, 8 Drawing Sheets

(51) Int. Cl.
*G02B 27/64* (2006.01)
*G03B 5/02* (2021.01)
*G03B 5/04* (2021.01)
*G03B 17/14* (2021.01)
*H04N 23/55* (2023.01)
*H04N 23/57* (2023.01)
*H04N 23/663* (2023.01)

(52) U.S. Cl.
CPC .............. *G03B 5/04* (2013.01); *G03B 17/14* (2013.01); *H04N 23/55* (2023.01); *H04N 23/57* (2023.01); *G03B 2205/0015* (2013.01); *H04N 23/663* (2023.01); *H04N 23/6812* (2023.01)

(58) Field of Classification Search
CPC .......... H05K 1/189; H05K 3/326; H05K 3/36; H05K 3/361; H05K 2201/10083
See application file for complete search history.

(56) References Cited

U.S. PATENT DOCUMENTS

| | | | |
|---|---|---|---|
| 2018/0231734 A1* | 8/2018 | Ochi | G02B 7/021 |
| 2020/0073202 A1* | 3/2020 | Noguchi | H04N 23/55 |
| 2020/0154986 A1* | 5/2020 | Shimoyama | A61B 1/00158 |

* cited by examiner

IMAGE STABILIZATION UNIT, LENS APPARATUS, AND IMAGE PICKUP APPARATUS

BACKGROUND

Field

The present disclosure relates to an image stabilization unit, a lens apparatus, and an image pickup apparatus.

Description of the Related Art

Hitherto, in order to prevent an image blur caused by a camera shake or the like, there has been proposed an apparatus which achieves a camera shake correction by detecting shake information of a camera with use of a shake detector and optically cancelling the shake in accordance with a detection result.

In Japanese Patent Application Laid-Open No. 2001-100074, there is disclosed a shift unit having the following configuration. A detection magnet configured to detect a position of a shift lens barrel that is driven for a camera shake correction is provided to the shift lens barrel, and a Hall element being a sensor corresponding to the detection magnet is provided to a sensor base being a fixed portion.

In Japanese Patent Application Laid-Open No. 2001-100074, the detection magnet is provided to the shift lens barrel being a movable portion. Thus, the weight of the movable portion is increased, with the result that a large amount of power is consumed. Meanwhile, when the detection magnet is provided to the fixed portion, and the Hall element is provided to the movable portion, in order to secure a space for leading a flexible substrate for energizing the Hall element, the apparatus is increased in size as a whole.

SUMMARY

The present disclosure relates to an image stabilization unit that is reduced in size.

According to an aspect of the present disclosure, an image stabilization unit includes an optical element, a lens barrel configured to hold the optical element, a magnet, a fixing member, a sensor configured to detect a position of the lens barrel by sensing magnetism of the magnet, and a flexible substrate connected to the sensor, wherein the flexible substrate includes a sensor mounting portion mounted to the sensor, a movable-side holding portion held by the lens barrel, and a fixed-side holding portion held by the fixing member, and wherein the movable-side holding portion and the fixed-side holding portion are located in such a manner as to overlap the sensor mounting portion in an optical-axis direction.

Further features of the present disclosure will become apparent from the following description of exemplary embodiments with reference to the attached drawings.

DESCRIPTION OF THE EMBODIMENTS

Preferred embodiments of the present disclosure will now be described in detail in accordance with the accompanying drawings.

In each drawing, an object side corresponds to a front side, and an image pickup element side corresponds to a rear side. Further, a direction of a vertical shake corresponds to a pitch direction P, and a direction of a lateral shake corresponds to a yaw direction Y.

Figure 1:
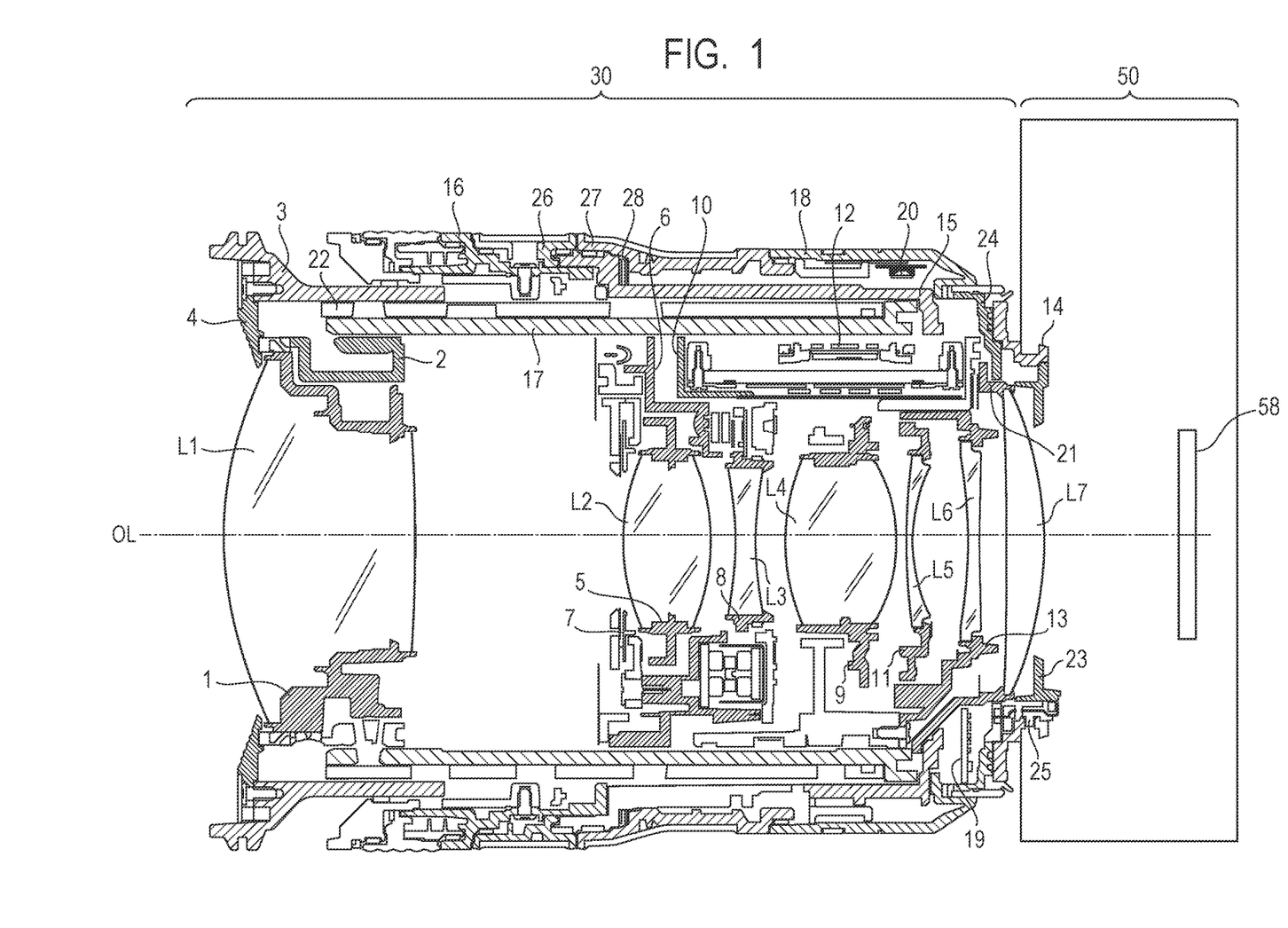
FIG. 1 is a sectional view of a lens barrel (30) according to an embodiment of the present disclosure.

FIG. 1 is a sectional view for illustrating a lens barrel 30 (lens apparatus) including an optical image stabilization unit 100 (image stabilization unit) according to an embodiment of the present disclosure. The lens barrel 30 includes a variable magnification optical system formed of seven groups, and optical systems (optical elements) include a first lens unit L1, a second lens unit L2, a third lens unit L3, a fourth lens unit L4, a fifth lens unit L5, a sixth lens unit L6, and a seventh lens unit L7. The third lens unit L3 is movable in a plane that is orthogonal to an optical axis OL (radial plane) to perform a shake correction. The fifth lens unit L5 is capable of advancing and retreating in an optical-axis direction to perform a focusing operation. Further, the first to sixth lens units are caused to advance and retreat in the optical-axis direction to perform a magnification varying operation.

The first lens unit L1 is held by a first lens unit barrel 1. The first lens unit barrel 1 is held by a first group base 2 so that, for optical adjustment, the first lens unit barrel 1 can be moved in the optical-axis direction.

A linear barrel 3 and the first lens unit L1 integrally advance and retreat along with a zooming operation. In the embodiment, the linear barrel 3 and the first lens unit L1 move while being supported by support structures which are different from each other (not shown). A decorative ring 4 has specifications and the like of the lens barrel 30 printed thereon. The decorative ring 4 is fixed by screw to the linear barrel 3 and forms an external appearance.

The second lens unit L2 is held by a second lens unit barrel 5. The second lens unit barrel 5 is held by a second group base 6 so that, for optical adjustment, the second lens unit barrel 5 can be moved in the optical-axis direction.

A stop unit 7 configured to perform light quantity adjustment is fixed to the second group base 6, and includes a plurality of light-blocking blades. The plurality of light-blocking blades of the stop unit 7 are driven by a stepping motor (not shown) as a drive source so that a desired F-value can be obtained.

The third lens unit L3 is held by a third lens unit barrel (hereinafter referred to as a shift lens barrel 8), and has a function of performing a shake correction by moving in the radial plane. Details of the shift lens barrel 8 (lens barrel) are described later.

The fourth lens unit L4 is held by a fourth lens unit barrel 9. The fourth lens unit barrel 9 is further held by a focus group base 10 so that, for optical adjustment, the fourth lens unit barrel 9 can be moved in the optical-axis direction and in a radial direction.

The fifth lens unit L5 (focus lens) is held by a fifth lens unit barrel 11. The fifth lens unit barrel 11 is supported in such a manner as to be capable of advancing and retreating in the optical-axis direction and moved by a drive mechanism (ultrasonic motor unit 12) and a linear guide mechanism (not shown) so that a focusing operation is performed. This linear guide mechanism uses two cylindrical members extending in the optical-axis direction, which are so-called guide bars. One of the two guide bars determines inclination and eccentricity of the fifth lens unit barrel 11, and another one of the two guide bars determines a rotational position about the optical axis OL. The fifth lens unit barrel 11 is supported in such a manner as to be capable of advancing and retreating along the guide bars.

The sixth lens unit L6 is held by a sixth lens unit barrel 13. The sixth lens unit barrel 13 is fixed by screw to the focus group base 10.

A mount 14 includes a bayonet portion for mounting the lens barrel 30 to a camera main body 50, and is fixed by screw to a rear-side fixing barrel 15. A front-side fixing barrel 16 is fixed by screw to the object side of the rear-side fixing barrel 15. Further, a guide barrel 17, an external-appearance barrel 18, and a printed board 19 having, for example, a drive IC for lenses and a microcomputer arranged thereon are fixed to the rear-side fixing barrel 15.

A seventh lens unit barrel 21 configured to hold the seventh lens unit L7 is fixed by screw to the guide barrel 17. Further, a cam barrel 22 which is rotatable only about the optical axis by rollers (not shown) is fitted to an outer periphery of the guide barrel 17. In the embodiment, the first group base 2, the linear barrel 3, the second group base 6, and the focus group base 10 are engaged with the guide barrel 17 and the cam barrel 22 by rollers. Rotation of the cam barrel 22 causes an intersection between a guide groove formed in the guide barrel 17 and extending in the optical-axis direction and a cam groove formed in the cam barrel 22 to move so that the lens barrels of the respective groups can advance and retreat in the optical-axis direction along with the movement.

A gyrosensor 20 fixed to the external-appearance barrel 18 is connected to the printed board 19. The gyrosensor 20 is configured to detect angular velocities of the vertical (pitch direction P) shake and the lateral (yaw direction Y) shake, which are angular shakes of a camera system.

On an outer peripheral surface of the external-appearance barrel 18 fixed by screw to the rear-side fixing barrel 15, there is arranged a switch (not shown) capable of performing MF/AF switching or IS mode switching. Further, a back cover 23 is fixed to the mount 14 that is fixed by screw to the rear-side fixing barrel 15.

A mount barrel 24 is fixed between the rear-side fixing barrel 15 and the mount 14. In the lens barrel 30 according to the embodiment, a focusing position with respect to an image pickup part 58 (image pickup element) can be adjusted by changing the thickness of the mount barrel 24 in the optical-axis direction through processing or the like. A contact point block 25 is connected to the printed board 19 by wiring (for example, FPC board) (not shown), and is fixed by screw to the mount 14.

A focus operation ring 26 is arranged on an outer side of the front-side fixing barrel 16 in the radial direction, and is supported at a certain position in such a manner as to be rotatable about the front-side fixing barrel 16. When the focus operation ring 26 is rotated, a sensor (not shown) detects the rotation of the focus operation ring 26, and the fifth lens unit barrel 11 is driven in accordance with the amount of rotation so that focusing control of the fifth lens unit L5 is performed.

A zoom operation ring 27 is supported by the rear-side fixing barrel 15 in such a manner as to be freely rotatable. A wave washer 28 being a thrust urging member is sandwiched between the zoom operation ring 27 and the rear-side fixing barrel 15 to form a thrust urging structure for urging the zoom operation ring 27 in the optical-axis direction.

The cam barrel 22 and the zoom operation ring 27 are coupled to each other by a zoom key (not shown). When a user rotates the zoom operation ring 27, the cam barrel 22 rotates. The zoom operation ring 27 is engaged with the rear-side fixing barrel 15 in a bayonet manner (not shown) so that a position in the optical-axis direction (thrust position) is determined.

The rotation of the cam barrel 22 is detected by a sensor (not shown), and a zoom position in accordance with the amount of rotation is determined based on the detected signal by an IC mounted to the printed board 19. Accordingly, focus control, vibration-isolation control, and stop control in accordance with the zoom position are performed.

The lens barrel 30 according to the embodiment is removably fixed to the camera main body 50 being an image pickup apparatus in a bayonet manner by the mount 14. When the lens barrel 30 is fixed to the camera main body 50 by the mount 14, the printed board 19 configured to control operations of the lens units can communicate with the camera main body 50 via the contact point block 25.

The image pickup part 58 is mounted to the camera main body 50, and is a photoelectric conversion element (image pickup element), such as a CMOS or a CCD, configured to receive light transmitted from an object through the lens barrel 30 and convert the light into an electric signal.

Figure 2:
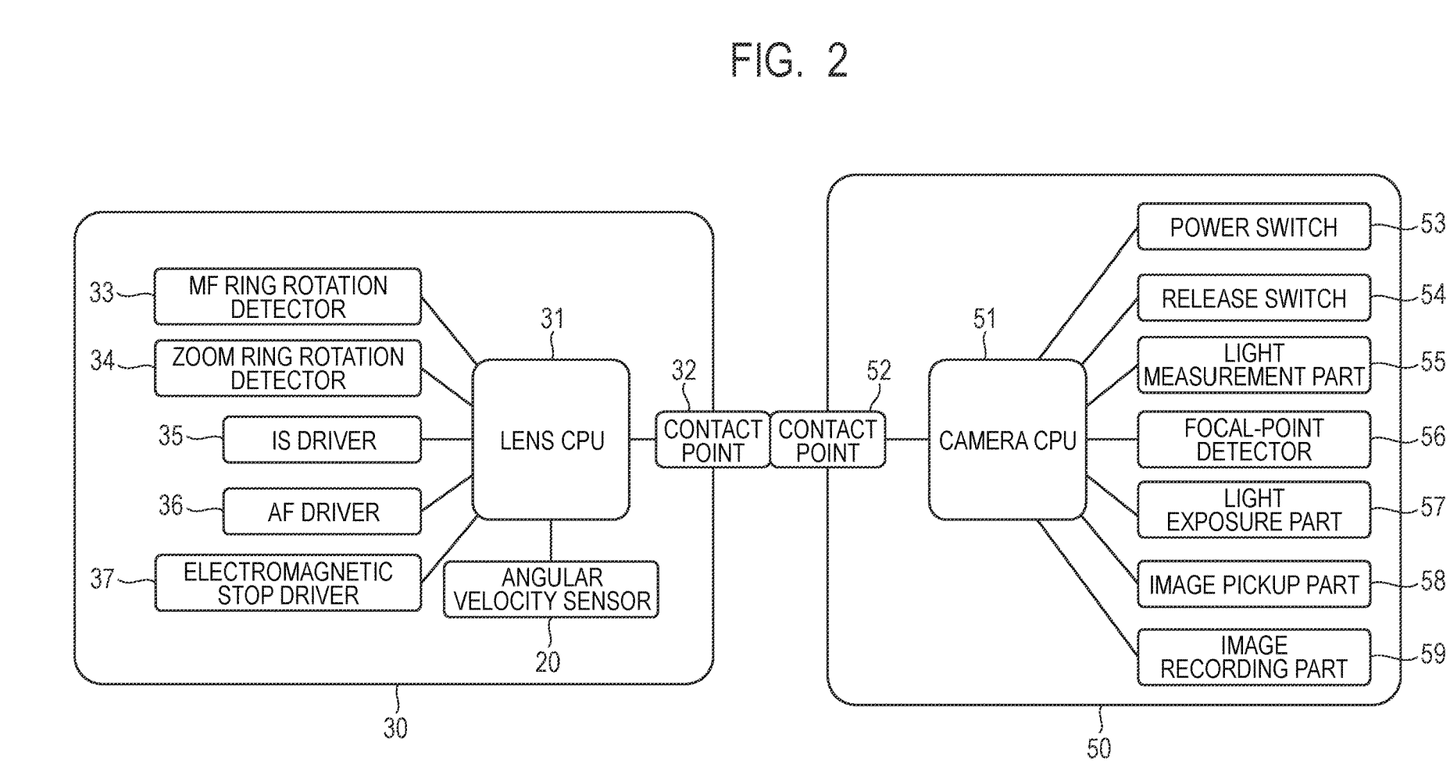
FIG. 2 is a system block diagram of the lens barrel (30) and a camera main body (50) according to the embodiment.

FIG. 2 shows an electric configuration of the camera system in the lens barrel 30 and the camera main body 50. First, a control flow in the camera main body 50 is described. A camera CPU 51 is formed of a microcomputer. The camera CPU 51 controls operations of components in the camera main body 50. Further, when the lens barrel 30 is mounted, the camera CPU 51 communicates with a lens CPU 31 provided in the lens barrel 30 via a lens-side electrical contact point 32 and a camera-side electrical contact point 52. Information (signal) transmitted to the lens CPU 31 by the camera CPU 51 includes drive amount information, parallel shake information, and focus shake information of the fifth lens unit L5. Further, information (signal) transmitted to the camera CPU 51 from the lens CPU 31 includes image pickup magnification information. The lens-side electrical contact point 32 and the camera-side electrical contact point 52 include a contact point for supplying power from the camera main body 50 to the lens barrel 30.

A power switch 53 is a switch which can be operated by an operator, and is capable of starting activation of the camera CPU 51 and supply of power to, for example, actuators and sensors in the camera system. A release switch 54 is a switch which can be operated by an operator, and includes a first stroke switch SW1 and a second stroke switch SW2. A signal from the release switch 54 is input to the camera CPU 51. The camera CPU 51 is brought into a photographing preparation state in accordance with input of an ON signal from the first stroke switch SW1. In the photographing preparation state, measurement of an object brightness by a light measurement part 55 and focal-point detection by a focal-point detector 56 are performed.

The camera CPU 51 calculates, for example, an aperture value of the stop unit 7 and a light exposure amount of the image pickup element of the image pickup part 58 (shutter speed) based on a light measurement result given by the light measurement part 55. Based on focal-point information (defocus amount and defocus direction) which is a detection result of a focal point state of a photographing optical system by the focal-point detector 56, the camera CPU 51 determines drive amounts (including drive directions) of the fifth lens unit L5 and the fifth lens unit barrel 11 for obtaining a focusing state with respect to an object. The information of the drive amounts of the fifth lens unit L5 and the fifth lens unit barrel 11 is transmitted to the lens CPU 31. The lens CPU 31 controls operations of components of the lens barrel 30.

Further, in a predetermined photographing mode, the camera CPU 51 starts control of shift drive for the shift lens barrel 8, that is, a vibration-isolation operation. When an ON signal from the second stroke switch SW2 is input, the camera CPU 51 transmits a stop drive command to the lens CPU 31 to set the stop unit 7 to an aperture value calculated in advance. Further, the camera CPU 51 transmits a light-exposure start command to a light exposure part 57 to allow a retreating operation of a mirror (not shown) and an opening operation of a shutter (not shown) to be performed, and allow photoelectric conversion of an object image, that is, a light exposure operation in the image pickup element of the image pickup part 58.

An image pickup signal from the image pickup part 58 is subjected to digital conversion at a signal processing part in the camera CPU 51 and further to various correction processes, and is output as an image signal. The image signal (data) is recorded and stored in a recording medium, for example, a semiconductor memory such as a flash memory, a magnetic disk, or an optical disc in an image recording part 59.

Next, a control flow in the lens barrel 30 is described. A MF ring rotation detector 33 detects the rotation of the focus operation ring 26, and a ZOOM ring rotation detector 34 detects the rotation of the zoom operation ring 27.

An IS driver 35 includes a drive actuator of the shift lens barrel 8 for performing the vibration-isolation operation, and a drive circuit for the drive actuator. An AF driver 36 performs AF drive of the fifth lens unit barrel 11 with an AF motor (ultrasonic motor unit 12) in accordance with the drive amount information of the fifth lens unit L5 transmitted from the camera CPU 51.

An electromagnetic stop driver 37 is controlled by the lens CPU 31 having received the stop drive command from the camera CPU 51 to operate the stop unit 7 into an opening state corresponding to a designated aperture value.

Detection values corresponding to the pitch direction P and the yaw direction Y of the camera system detected by the gyrosensor 20 (angular velocity sensor) are output as angular velocity signals to the lens CPU 31. The lens CPU 31 electrically or mechanically integrates the angular velocity signals corresponding to the pitch direction P and the yaw direction Y from the gyrosensor 20 to calculate a pitch-direction shake amount and a yaw-direction shake amount (which are hereinafter collectively referred to as an angular shake amount) which are displacement amounts in the respective directions.

The lens CPU 31 controls the IS driver 35 based on a synthesized displacement amount of the angular shake amount and the parallel shake amount mentioned above to allow the shift lens barrel 8 to perform the shift drive, thereby performing an angular shake correction and a parallel shake correction. Further, the lens CPU 31 controls the AF driver 36 based on the focus shake amount to allow the fifth lens unit barrel 11 to drive in the optical-axis direction, thereby performing a focus shake correction.

Figure 3:
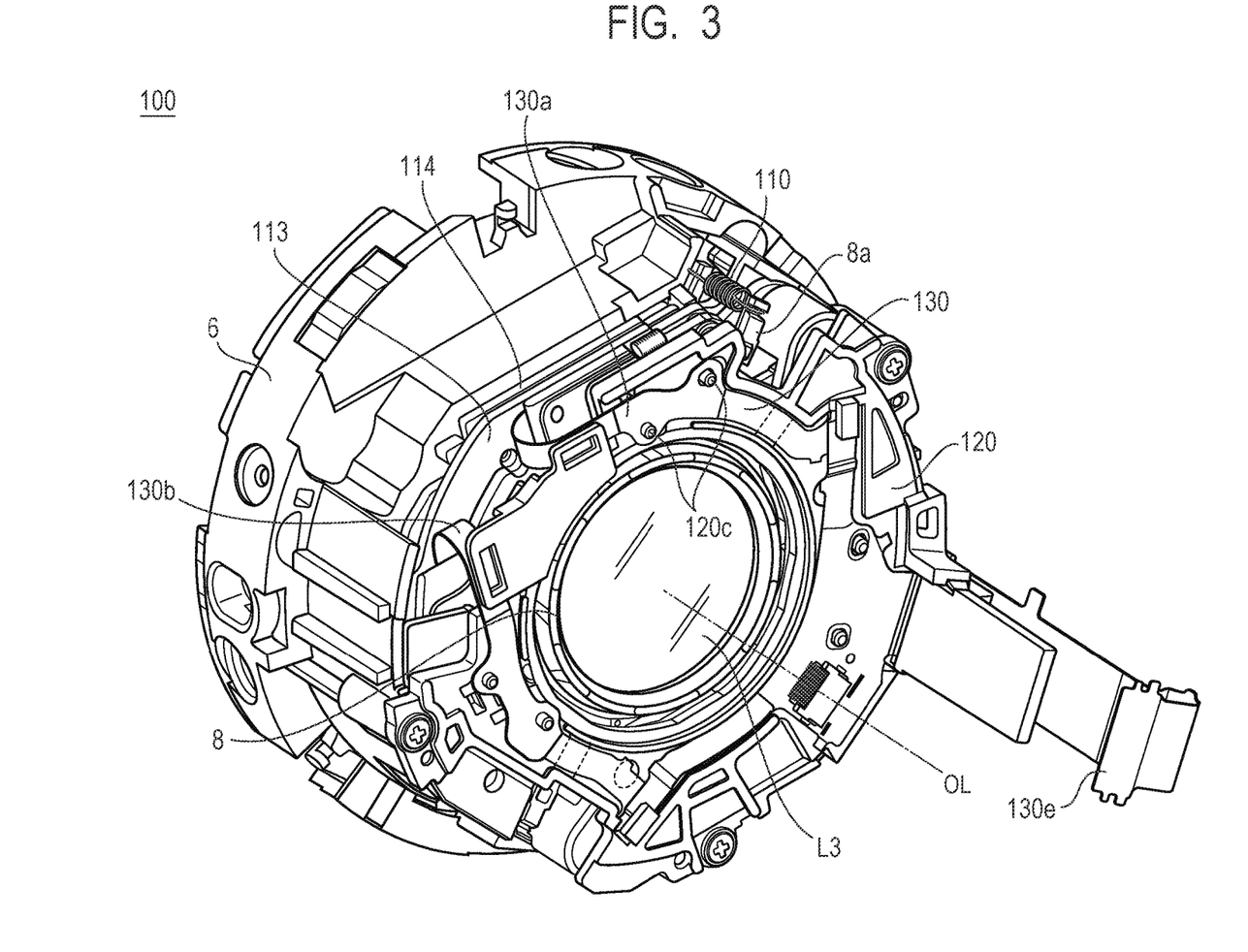
FIG. 3 is a perspective view of an optical image stabilization unit (100) according to the embodiment.

Next, the optical image stabilization unit 100 according to the embodiment is described in detail. FIG. 3 is a perspective view of the optical image stabilization unit 100. In the optical image stabilization unit 100, the second group base 6 is engaged with the cam barrel 22 and the guide barrel 17 through intermediation of rollers (not shown) so that the optical image stabilization unit 100 can advance and retreat in the optical-axis direction.

The shift lens barrel 8 is urged against the second group base 6 through intermediation of a rolling support structure described later in the optical-axis direction by a spring 110 held by a spring holding portion 8a of the shift lens barrel 8. Further, a thrust force in the radial plane can be applied to the shift lens barrel 8 by a voice coil motor (VCM) of a so-called moving coil type.

In the optical image stabilization unit 100 according to the embodiment, for position detection of the shift lens barrel 8, a method of using a Hall IC 131 (sensor) is employed. Particularly in the embodiment, the shift lens barrel 8 holds the Hall IC 131 (see FIG. 4) configured to detect magnetism (sense magnetism), and a magnet holding member 120 (fixing member) fixed by screw to the second group base 6 holds a magnet 121 (see FIG. 6) for the position detection.

For energization of the VCM and the Hall IC 131 and transmission of a position signal, the optical image stabilization unit 100 includes a flexible substrate 130, and a terminal portion 130e of the flexible substrate 130 is connected to the printed board 19. In the optical image stabilization unit 100 that employs the VCM of the moving coil type, the shift lens barrel 8 holds the Hall IC 131 so that effects such as reduction in weight of the shift lens barrel 8 to be driven, simplification of wiring, and standardization of the flexible substrate 130 can be achieved.

Figure 4:
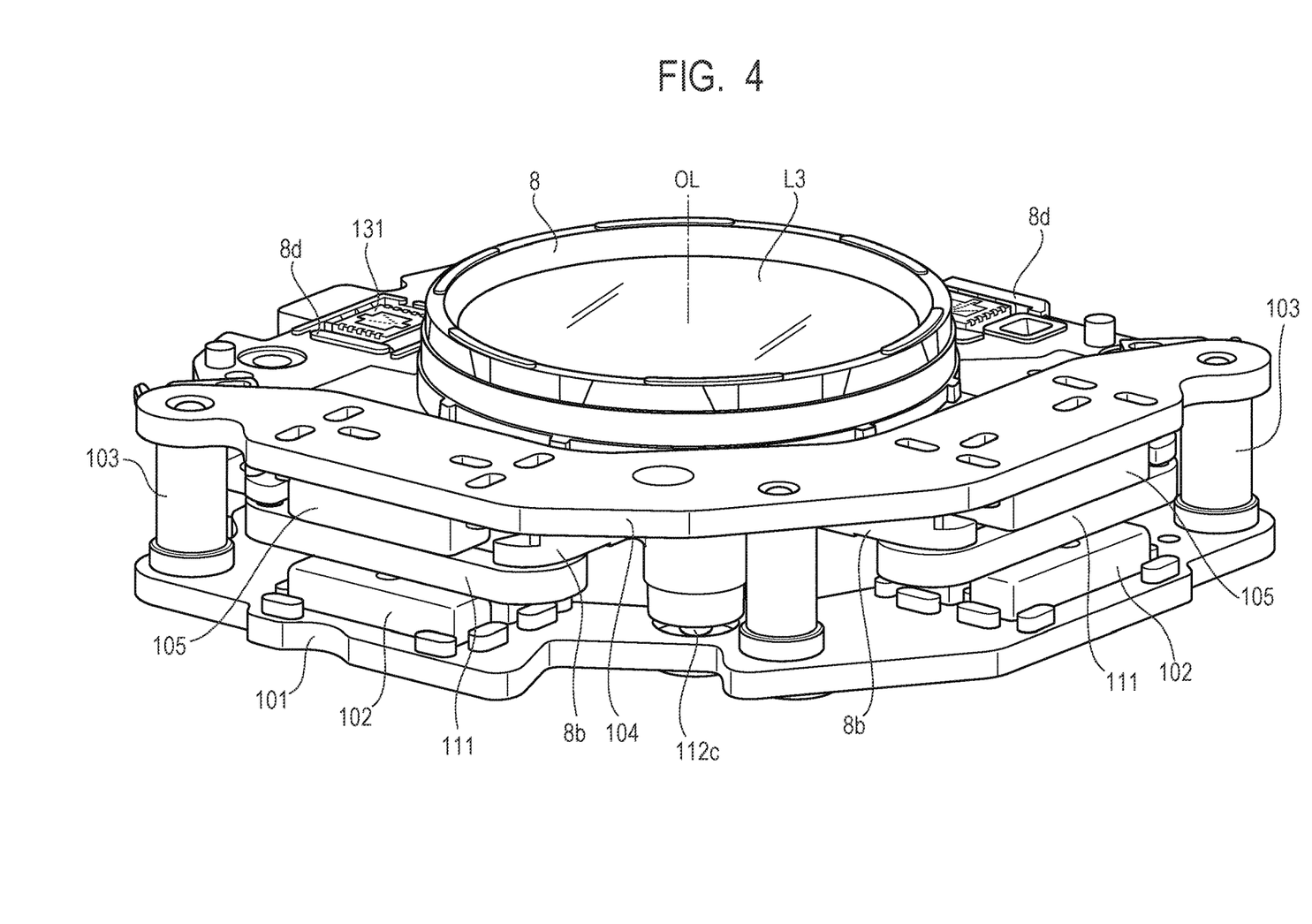
FIG. 4 is an enlarged perspective view of a VCM of the optical image stabilization unit (100) according to the embodiment.

Next, with reference to FIG. 4, the VCM of the moving coil type in the embodiment is described in detail. FIG. 4 is an enlarged perspective view of the VCM of the optical image stabilization unit 100 according to the embodiment. In FIG. 4, for convenience of description, the second group base 6 and the magnet holding member 120 are not illustrated.

Drive coils 111 are held by coil holding portions 8b of the shift lens barrel 8. The drive coils 111 are each formed of a lead wire, and generate a magnetic field that is dependent on a direction of a current when energized.

A first yoke 101 is fixed by screw to the second group base 6 (not shown in FIG. 4). The first yoke 101 is made of a metal having a high magnetic permeability in general, and first-yoke-side magnets 102 are fixed to the first yoke 101 by magnetic attraction.

A second yoke 104 is arranged at a position opposed to the first yoke 101, and the drive coils 111 are located in such a manner as to be sandwiched between the first yoke 101 and the second yoke 104. Further, second-yoke-side magnets 105 are fixed to the second yoke 104 by magnetic attraction.

It is preferred that the second yoke 104 be also made of a metal having a high magnetic permeability, and the first-yoke-side magnets 102 and the second-yoke-side magnets 105 are magnetically attracted to each other through intermediation of shafts 103. With this configuration, a magnetic circuit that is positioned by the optical-axis direction and the radial plane is formed. When the drive coils 111 are energized, a thrust force for driving the shift lens barrel 8 can be generated in accordance with a change in the magnetic field generated by the drive coils 111.

Figure 5:
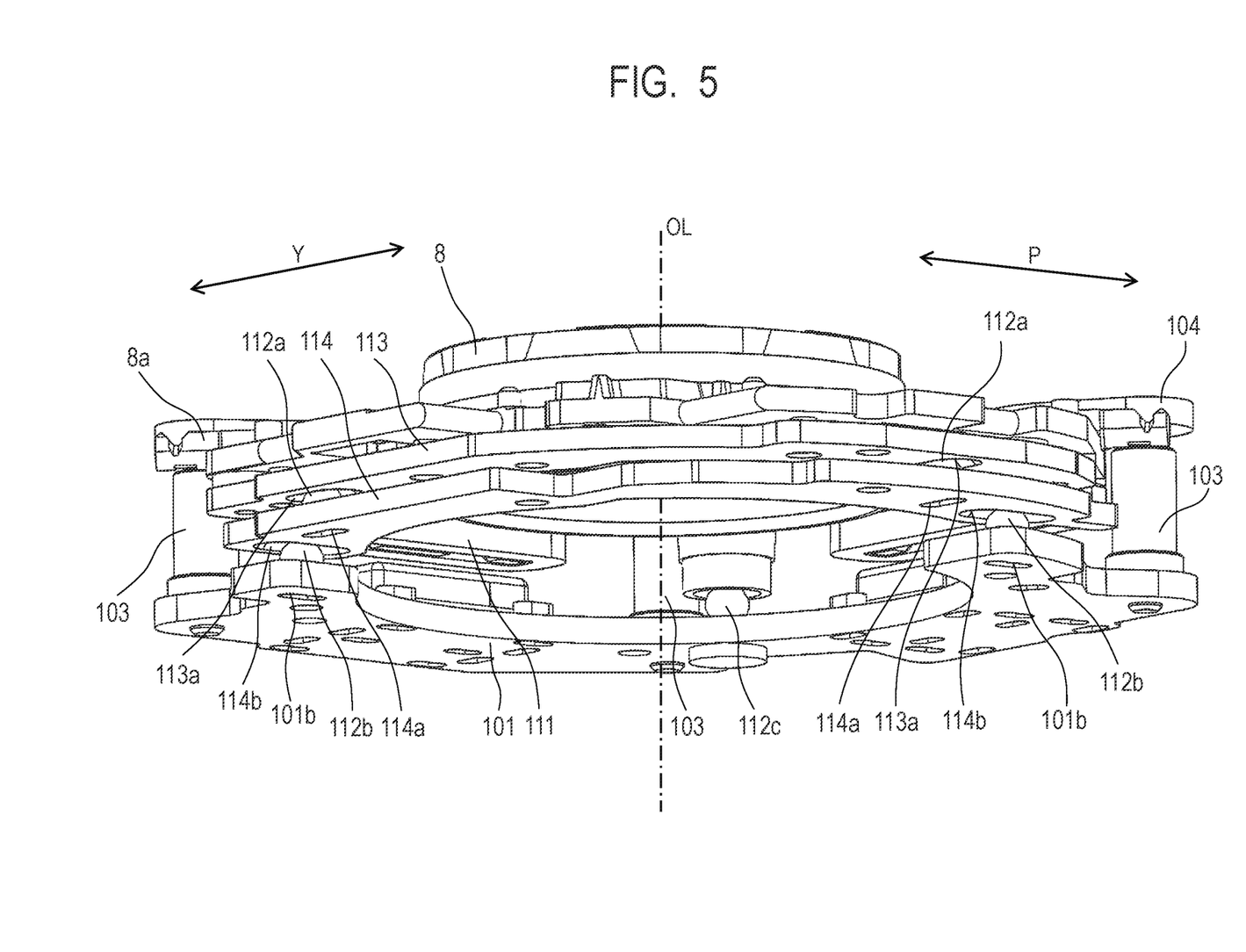
FIG. 5 is an enlarged perspective view of a rolling support structure of the optical image stabilization unit (100) according to the embodiment.

FIG. 5 is an enlarged perspective view for illustrating details of the rolling support structure with rolling members in the embodiment. Also in FIG. 5, for convenience of description, the second group base 6 and the magnet holding member 120 are not illustrated.

A first regulation member 113 is fixed by screw to the shift lens barrel 8. The first regulation member 113 has two first-regulation-member V-groove portions 113a extending in the yaw direction Y (first direction) of FIG. 5. A second regulation member 114 is provided between the first regulation member 113 and the first yoke 101. The second regulation member 114 has, in a surface thereof opposed to the first-regulation-member V-groove portions 113a, two second-regulation-member yaw V-groove portions 114a extending in the yaw direction Y. A first rolling ball 112a (rolling member) that rolls in the yaw direction Y is provided between each pair of the first-regulation-member V-groove portion 113a and the second-regulation-member yaw V-groove portion 114a.

The first regulation member 113 is supported in such a manner as to roll in the yaw direction Y with respect to the second regulation member 114 by the first rolling balls 112a that roll in the yaw direction Y between the first-regulation-member V-groove portions 113a and the second-regulation-member yaw V-groove portions 114a. That is, with the plurality of first rolling balls 112a abutting against the first regulation member 113, the first regulation member 113 regulates movement of the shift lens barrel 8 in the plane that is orthogonal to the optical axis OL only in the first direction.

The second regulation member 114 further has two second-regulation-member pitch V-groove portions 114b extending in the pitch direction P (second direction) of FIG. 5. Further, the first yoke 101 has, in a surface thereof opposed to the second-regulation-member pitch V-groove portions 114b, two first-yoke V-groove portions 101b extending in the pitch direction P. A second rolling ball 112b (rolling member) that rolls in the pitch direction P is provided between each pair of the second-regulation-member pitch V-groove portion 114b and the first-yoke V-groove portion 101b. The second regulation member 114 is supported in such a manner as to roll in the pitch direction P with respect to the first yoke 101 by the second rolling balls 112b that roll in the pitch direction P between the second-regulation-member pitch V-groove portions 114b and the first-yoke V-groove portions 101b.

As mentioned above, a moving direction of the shift lens barrel 8 having the first regulation member 113 fixed thereto is regulated by the first regulation member 113 and the second regulation member 114 with respect to the first yoke 101 only in the pitch direction P and the yaw direction Y. Further, in order to reliably allow the movement of the shift lens barrel 8 in the pitch direction P and the yaw direction Y with respect to the first yoke 101, a third rolling ball 112c is provided.

Figure 6:
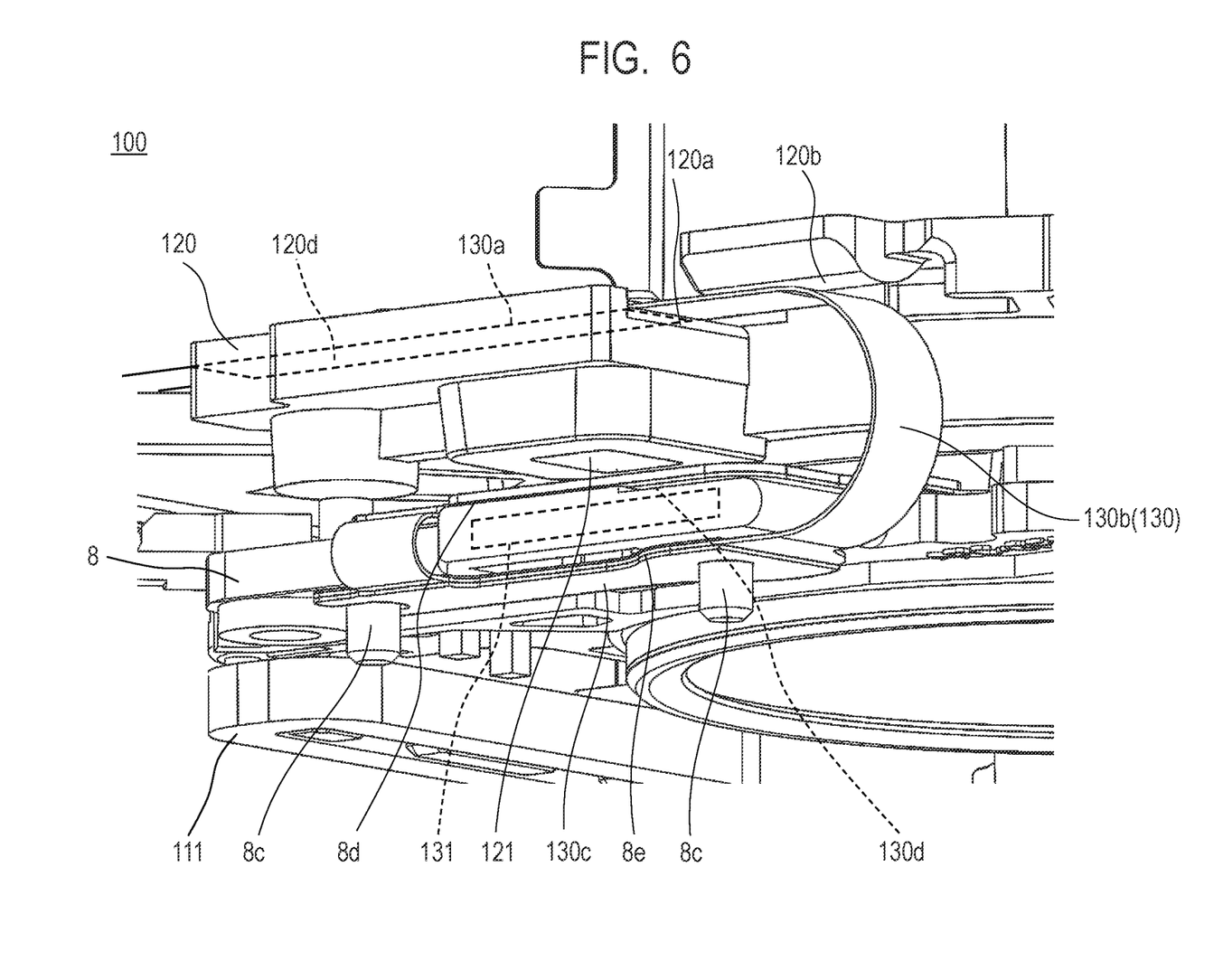
FIG. 6 is a perspective view for illustrating leading of a flexible substrate (130) of the optical image stabilization unit (100) according to the embodiment.

Next, leading of the flexible substrate 130 in the embodiment is described in detail. FIG. 6 is a perspective view for illustrating details of a layout of the flexible substrate 130 around the Hall IC 131 indicated by broken lines.

The Hall IC 131 held by the shift lens barrel 8 is electrically connected to the flexible substrate 130 at a Hall IC mounting portion 130d (sensor mounting portion) of the flexible substrate 130. The Hall IC mounting portion 130d is fixed to a Hall IC mounting surface 8d (sensor mounting surface) provided to the shift lens barrel 8, for example, by thermal caulking or with use of a UV adhesive.

It is required that the flexible substrate 130 having a function of energizing the drive coils 111 and the Hall IC 131 held by the shift lens barrel 8 as in the embodiment have a connection portion for connecting a movable portion and a fixed portion of the optical image stabilization unit 100. In such optical image stabilization unit 100, in order to secure durability, it is required to suppress stress of the flexible substrate 130 generated along with movement of the movable portion. Thus, it is preferred that the connection portion have the following configuration. Specifically, the connection portion has, for example, a substantially semicircular shape, and a holding portion of the flexible substrate 130 on the movable side (movable-side holding portion 130c) and a holding portion on the fixed side (fixed-side holding portion 130a) are connected, thereby reducing the rigidity of the flexible substrate 130. Further, in order to prevent twisting of the connection portion caused by variation in assembly and misalignment in mounting of the Hall IC 131, it is required that the respective holding portions of the flexible substrate 130 on the movable side and the fixed side be positioned with high accuracy.

Figure 8:
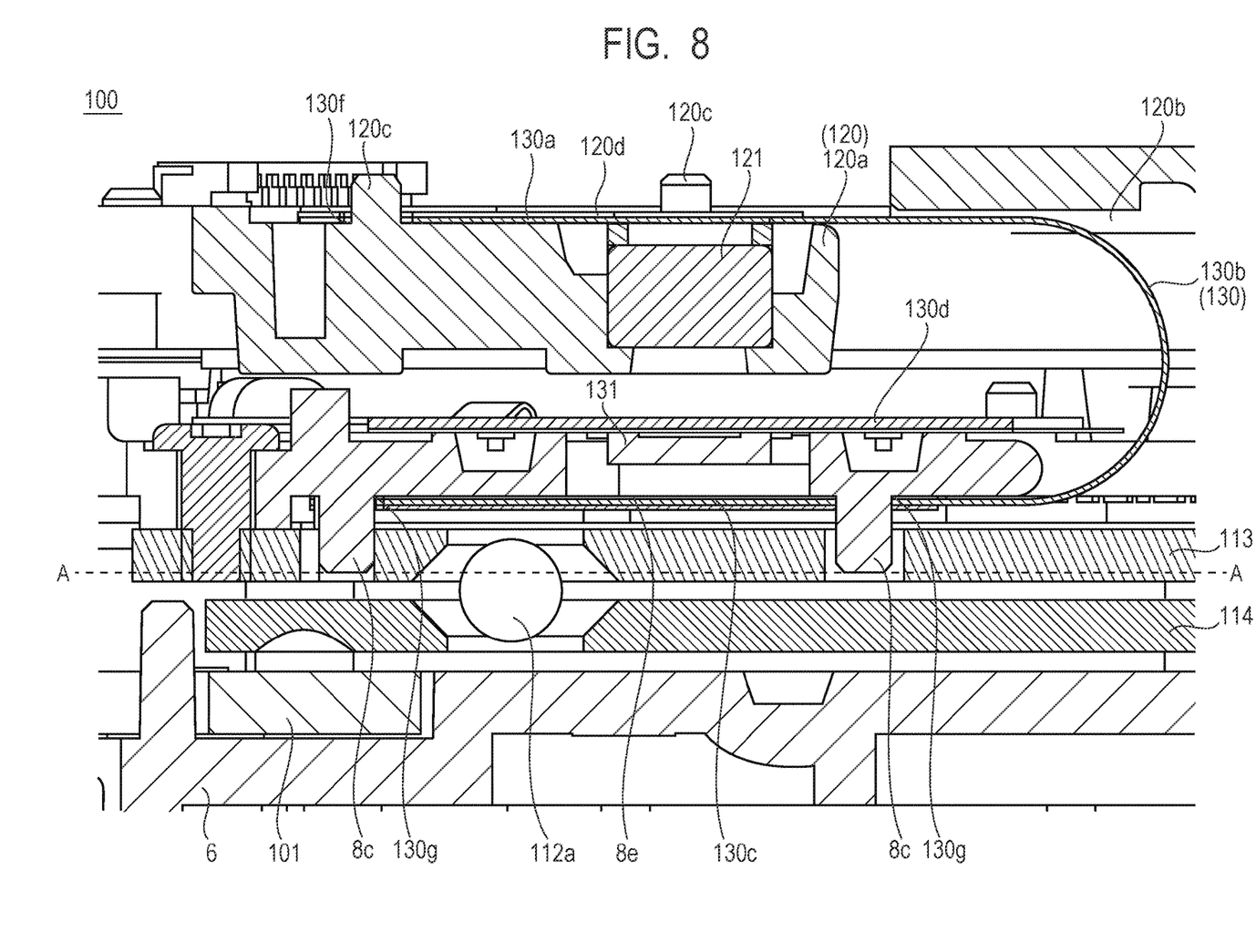
FIG. 8 is a sectional view taken along a section line VIII of FIG. 7.

In the embodiment, the positioning on the movable side is achieved with a movable-side positioning pin 8c (movable-side positioning portion) provided to the shift lens barrel 8, and the positioning on the fixed side is achieved with a fixed-side positioning pin 120c (fixed-side positioning portion, see FIG. 8). Further, the movable-side holding portion 130c by which the flexible substrate 130 is held on the shift lens barrel 8 is held on a first holding surface 8e which is located on a side of a back surface of the Hall IC mounting surface 8d in the optical-axis direction. The movable-side holding portion 130c and the fixed-side holding portion 130a held by the magnet holding member 120 are arranged in such a manner as to be located to overlap the Hall IC mounting portion 130d when seen in the optical-axis direction.

In a related-art image stabilization unit, the image stabilization unit is increased in size in the radial plane by the positioning shape of the flexible substrate on the movable side and the fixed side. However, according to the embodiment, the movable-side holding portion 130c is held on the first holding surface 8e located on the side of the back surface of the Hall IC mounting surface 8d. Thus, the movable-side holding portion 130c and the fixed-side holding portion 130a are located in such a manner as to overlap the Hall IC mounting portion 130d in the optical-axis direction. Further, the fixed-side holding portion 130a is held on a second holding surface 120d of the magnet holding member 120 that is parallel to the radial plane, and the Hall IC mounting portion 130d and the magnet 121 are located between the first holding surface 8e and the second holding surface 120d in the optical-axis direction. Thus, according to the embodiment, the optical image stabilization unit 100 can be reduced in size in the radial direction.

Figure 7:
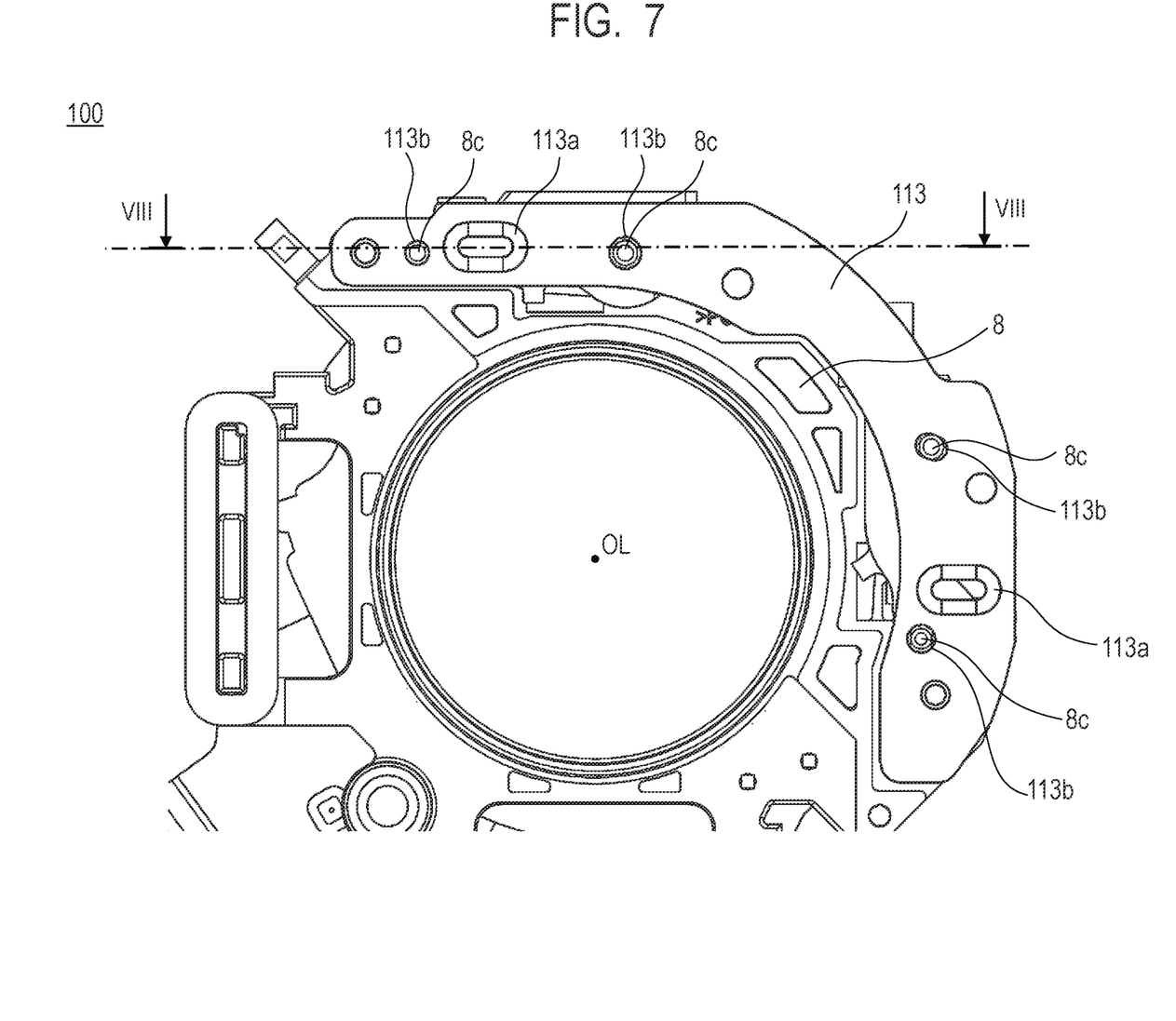
FIG. 7 is a plan view of the optical image stabilization unit (100) according to the embodiment.

FIG. 7 is a plan view of the optical image stabilization unit 100 when seen in the optical-axis direction. The first regulation member 113 has positioning holes 113b corresponding to at least one movable-side positioning pin 8c. Positioning of the first regulation member 113 with respect to the shift lens barrel 8 is performed with the positioning hole 113b of the first regulation member 113 and the movable-side positioning pin 8c. Further, positioning of the flexible substrate 130 is performed with a positioning hole 130g of the flexible substrate 130 and the movable-side positioning pin 8c (see FIG. 8). As described above, the first regulation member 113 and the flexible substrate 130 are both positioned with use of the movable-side positioning pin 8c. According to the embodiment, through use of one common positioning shape (movable-side positioning portion) with respect to a plurality of components, the optical image stabilization unit 100 can be further reduced in size in the radial plane as compared to related-art image stabilization units. Further, the optical image stabilization unit 100 can be reduced in size not only in the radial direction but also in the optical-axis direction.

FIG. 8 is a sectional view taken along the section line VIII of FIG. 7. As mentioned above, in order to secure the durability of the optical image stabilization unit 100, a connection portion having a substantially semicircular shape for connecting the movable portion and the fixed portion of the flexible substrate 130 is required. When a radius of the semicircle cannot be set to a certain value or larger, the stress generated in the flexible substrate 130 along with the drive of the movable portion cannot be alleviated.

In the optical image stabilization unit 100 according to the embodiment, the Hall IC 131 used for the position detection and the magnet 121 for the position detection are arranged between the movable-side holding portion 130c and the fixed-side holding portion 130a. The flexible substrate 130 can form a substantially semicircular bending shape (bent portion 130b) by being brought into abutment against a flexible substrate holding portion 120a provided to the magnet holding member 120 and against a flexible substrate abutment portion 120b provided in an extending manner. According to the present disclosure, a space efficiency required for the bent portion 130b for alleviation of the stress of the flexible substrate 130 can be improved, and reduction in size in the optical-axis direction can be achieved.

The broken line A illustrated in FIG. 8 indicates a position of a distal end portion of the movable-side positioning pin 8c in the optical-axis direction. In the optical image stabilization unit 100, the rolling members (first rolling balls 112a) and the movable-side positioning pin 8c are present on the same plane that is orthogonal to the optical axis OL, thereby achieving further reduction in size in the optical-axis direction.

Further, at least one movable-side positioning pin 8c is provided to the first holding surface 8e, and at least one fixed-side positioning pin 120c is provided to the second holding surface 120d. Further, the movable-side holding portion 130c has the positioning hole 130g corresponding to the movable-side positioning pin 8c, and the fixed-side holding portion 130a has the positioning hole 130f corresponding to the fixed-side positioning pin 120c. With use of two movable-side positioning pins 8c provided to the first holding surface 8e and two fixed-side positioning pins 120c provided to the second holding surface 120d, the flexible substrate 130 can be positioned with high accuracy. Thus, the optical image stabilization unit 100 which is excellent in durability and is reduced in size in the radial plane can be provided.

Exemplary embodiments of the present disclosure have been described above. However, the present disclosure is not limited to those embodiments, and various modifications and changes can be made within the scope of the gist. Further, the lens barrel 30 to which the optical image stabilization unit 100 according to the embodiment of the present disclosure is applied is used for an image pickup apparatus including an image pickup element configured to pick up an image formed by the lens barrel 30 or for an image pickup system including an image pickup apparatus main body which includes an image pickup element and to which the lens barrel 30 is removably mountable.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-200146, filed Dec. 2, 2020, which is hereby incorporated by reference herein in its entirety.

What is claimed is:

1. An image stabilization unit comprising:
   an optical element;
   a lens barrel configured to hold the optical element;
   a magnet;
   a fixing member;
   a sensor configured to detect a position of the lens barrel by sensing magnetism of the magnet; and
   a flexible substrate having (i) a fixed-side holding portion held by the fixing member, (ii) a bent portion, (iii) a movable-side holding portion held by the lens barrel, and (iv) a sensor mounting portion at which the sensor is connected to the flexible substrate,
   wherein, as viewed along an optical-axis direction of the optical element, the sensor mounting portion, the movable-side holding portion, and the fixed-side holding portion are located in such a manner as to overlap each other,
   the movable-side holding portion and the fixed-side holding portion are connected to each other by the bent portion, and
   the sensor mounting portion is arranged between the movable-side holding portion and the fixed-side holding portion along the optical-axis direction.

2. The image stabilization unit according to claim 1,
   wherein the sensor mounting portion is provided on a sensor mounting surface of the lens barrel, and
   wherein the movable-side holding portion is held on a first holding surface located on a back surface of the sensor mounting surface.

3. The image stabilization unit according to claim 2,
   wherein the fixing member holds the magnet,
   wherein the fixed-side holding portion is held on a second holding surface of the fixing member parallel to a plane that is orthogonal to an optical axis, and
   wherein the sensor mounting portion and the magnet are located between the first holding surface and the second holding surface in the optical-axis direction.

4. The image stabilization unit according to claim 3,
   wherein the first holding surface has two movable-side positioning portions,
   wherein the second holding surface has two fixed-side positioning portions,
   wherein the movable-side holding portion has positioning holes corresponding to the two movable-side positioning portions, and
   wherein the fixed-side holding portion has positioning holes corresponding to the two fixed-side positioning portions.

5. The image stabilization unit according to claim 4, further comprising a first regulation member configured to regulate movement of the lens barrel in the plane that is orthogonal to the optical axis only in a first direction,
   wherein the first regulation member is fixed to the lens barrel, and has a positioning hole corresponding to at least one of the two movable-side positioning portions.

6. The image stabilization unit according to claim 5, further comprising a plurality of rolling members which abuts against the first regulation member,
wherein the plurality of rolling members and the two movable-side positioning portions are located in the plane that is orthogonal to the optical axis.

7. The image stabilization unit according to claim 1, wherein the sensor is held by the lens barrel.

8. A lens apparatus comprising:
an image stabilization unit,
wherein the image stabilization unit includes:
an optical element,
a lens barrel configured to hold the optical element,
a magnet,
a fixing member,
a sensor configured to detect a position of the lens barrel by sensing magnetism of the magnet, and
a flexible substrate having (i) a fixed-side holding portion held by the fixing member, (ii) a bent portion, (iii) a movable-side holding portion held by the lens barrel, and (iv) a sensor mounting portion at which the sensor is connected to the flexible substrate,
wherein, as viewed along an optical-axis direction of the optical element, the sensor mounting portion, the movable-side holding portion, and the fixed-side holding portion are located in such a manner as to overlap each other,
the movable-side holding portion and the fixed-side holding portion are connected to each other by the bent portion, and
the sensor mounting portion is arranged between the movable-side holding portion and the fixed-side holding portion along the optical-axis direction.

9. An image pickup apparatus comprising:
a lens apparatus having an image stabilization unit; and
an image pickup element configured to pick up an image formed by the lens apparatus,
wherein the image stabilization unit includes:
an optical element,
a lens barrel configured to hold the optical element,
a magnet,
a fixing member,
a sensor configured to detect a position of the lens barrel by sensing magnetism of the magnet, and
a flexible substrate having (i) a fixed-side holding portion held by the fixing member, (ii) a bent portion, (iii) a movable-side holding portion held by the lens barrel, and (iv) a sensor mounting portion at which the sensor is connected to the flexible substrate,
wherein, as viewed along an optical-axis direction of the optical element, the sensor mounting portion, the movable-side holding portion, and the fixed-side holding portion are located in such a manner as to overlap each other,
the movable-side holding portion and the fixed-side holding portion are connected to each other by the bent portion, and
the sensor mounting portion is arranged between the movable-side holding portion and the fixed-side holding portion along the optical-axis direction.

10. The image pickup apparatus according to claim 9, further comprising an image pickup apparatus main body which includes the image pickup element and to which the lens apparatus is removably mountable.

* * * * *